United States Patent
Zhang

(10) Patent No.: US 10,651,431 B2
(45) Date of Patent: May 12, 2020

(54) MANUFACTURING METHOD FOR ELECTRONIC DEVICE AND ELECTRONIC DEVICE

(71) Applicant: GUANGDONG OPPO MOBILE TELECOMMUNICATIONS CORP., LTD., Dongguan (CN)

(72) Inventor: Wenzhen Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 91 days.

(21) Appl. No.: 15/859,134

(22) Filed: Dec. 29, 2017

(65) Prior Publication Data

US 2018/0277800 A1 Sep. 27, 2018

(30) Foreign Application Priority Data

Mar. 22, 2017 (CN) .......................... 2017 1 0175614
Mar. 22, 2017 (CN) ...................... 2017 2 0288666 U

(51) Int. Cl.
*H01M 4/13* (2010.01)
*H01M 2/02* (2006.01)
(Continued)

(52) U.S. Cl.
CPC ....... *H01M 2/0207* (2013.01); *H01M 2/1066* (2013.01); *H01M 10/0436* (2013.01);
(Continued)

(58) Field of Classification Search
CPC ............. H01M 2/0207; H01M 2/1066; H01M 10/6551; H01M 10/0436; H01M 10/425; H01M 2220/30
See application file for complete search history.

(56) References Cited

U.S. PATENT DOCUMENTS

2013/0323575 A1* 12/2013 Tagawa .................. H01M 2/22
429/158
2014/0177141 A1 6/2014 Cao
2017/0033335 A1 2/2017 Kojima et al.

FOREIGN PATENT DOCUMENTS

CN 103887451 A 6/2014
CN 104576990 A 4/2015
(Continued)

OTHER PUBLICATIONS

PCT/CN2018/071963 English translation of International Search Report and Written Opinion dated Apr. 20, 2018, 10 pages.
(Continued)

*Primary Examiner* — Jane J Rhee
(74) *Attorney, Agent, or Firm* — Lathrop GPM LLP

(57) ABSTRACT

A manufacturing method for an electronic device is provided. The method includes: providing an inner shell, the inner shell defining a battery compartment for a battery, and the battery compartment including a bottom surface and a side wall; adhering a first adhesive to the bottom surface of the battery compartment; providing an adhesive film covering the first adhesive, the bottom surface and the side wall of the battery compartment; fixing the battery in the battery compartment by the adhesive film; and coating a second adhesive into spaces between a side surface of the battery and the adhesive film, a bonding force of the adhesive film and a bonding force of the second adhesive each being less than a tensile resistance of a surface of the battery.

20 Claims, 6 Drawing Sheets

(51) Int. Cl.
  *H01M 2/10*     (2006.01)
  *H01M 10/6551*  (2014.01)
  *H01M 10/04*    (2006.01)
  *H01M 10/42*    (2006.01)

(52) U.S. Cl.
  CPC ..... *H01M 10/425* (2013.01); *H01M 10/6551* (2015.04); *H01M 2220/30* (2013.01)

(56) References Cited

FOREIGN PATENT DOCUMENTS

| | | |
|---|---|---|
| CN | 105219286 A | 1/2016 |
| CN | 106165147 A | 11/2016 |
| CN | 106331232 A | 1/2017 |
| CN | 106935754 A | 7/2017 |
| CN | 206541875 U | 10/2017 |
| JP | 2015211022 A | 11/2015 |
| WO | WO 2015186285 A1 | 12/2015 |

OTHER PUBLICATIONS

European Patent Application No. 18150555.3 extended Search and Opinion dated Jun. 6, 2018, 9 pages.
Chinese Patent Application No. 201710175614.7, Office Action dated Dec. 5, 2018, 8 pages.
Chinese Patent Application No. 201710175614.7, English translation of Office Action dated Dec. 5, 2018, 10 pages.
Taiwan Patent Application No. 106144053, Office Action dated Dec. 19, 2018, 8 pages.

* cited by examiner

MANUFACTURING METHOD FOR ELECTRONIC DEVICE AND ELECTRONIC DEVICE

CROSS-REFERENCE TO RELATED APPLICATIONS

This application claims priority to and benefits of Chinese Patent Applications No. 201710175614.7 and 201720288666.0, filed with State Intellectual Property Office on Mar. 22, 2017, the entire content of which is incorporated herein by reference.

FIELD

The present disclosure relates to a technical field of consumer electronics, and more particularly to a manufacturing method for an electronic device and an electronic device.

BACKGROUND

For a battery of a mobile phone in the related art, the battery is generally immobilized in a battery compartment after the battery compartment is coated with an adhesive, so as to completely immobilize the battery. However, this makes the battery difficult to be removed, or even causes the battery to be bent, damaged or scrapped when the mobile phone is to be maintained.

SUMMARY

Embodiments of a first aspect of the present disclosure provide a manufacturing method for an electronic device.

The manufacturing method for the electronic device according to embodiments of the present disclosure includes:

providing an inner shell, the inner shell having a battery compartment for a battery, and the battery compartment including a bottom surface and a side wall;

adhering a first adhesive to the bottom surface of the battery compartment;

providing an adhesive film covering the first adhesive, the bottom surface and the side wall of the battery compartment;

fixing the battery in the battery compartment by the adhesive film; and coating a second adhesive into spaces between a side surface of the battery and the adhesive film, a bonding force of the adhesive film and a bonding force of the second adhesive each being less than a tensile resistance of a surface of the battery.

Embodiments of a second aspect of the present disclosure provide an electronic device.

The electronic device according to embodiments of the present disclosure includes:

an inner shell having a battery compartment for the battery, the battery compartment including a bottom surface and a side wall;

a first adhesive adhered to the bottom surface of the battery compartment;

an adhesive film covering the first adhesive, the bottom surface and the side wall of the battery compartment;

a battery received in the battery compartment; and a second adhesive coated in spaces between the battery and the side wall of the battery compartment, a bonding force of the adhesive film and a bonding force of the second adhesive each being less than a tensile resistance of a surface of the battery.

Embodiments of a third aspect of the present disclosure provide an electronic device.

The electronic device according to embodiments of the present disclosure includes:

an inner shell defining a battery compartment;

a battery received in the battery compartment;

an adhesive film arranged between the battery compartment and the battery;

a first adhesive arranged between the battery compartment and the adhesive film; and a second adhesive coated in a lateral gap between the battery compartment and the battery.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from descriptions made with reference to following drawings.

DETAILED DESCRIPTION

Figure 1:
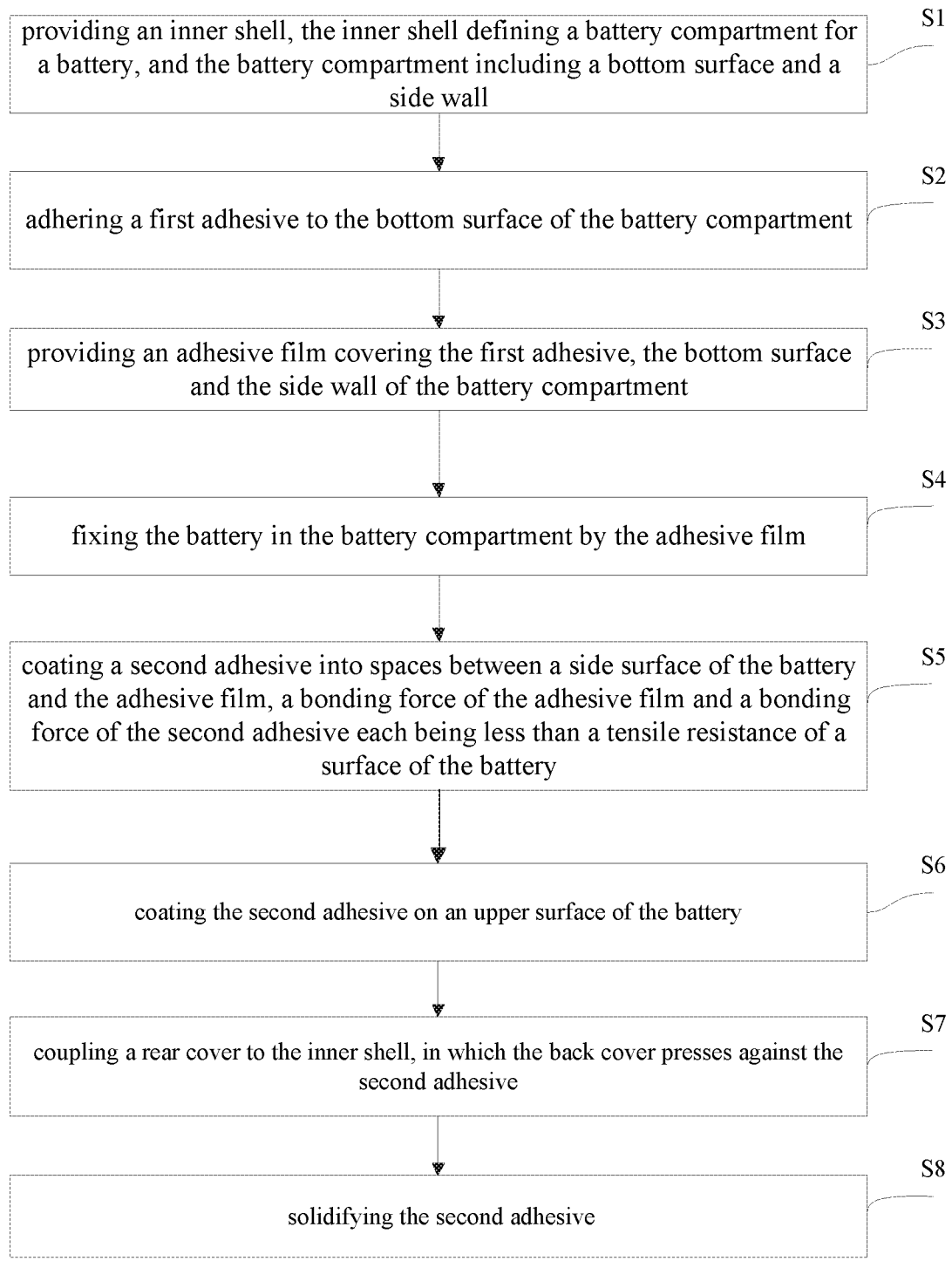
FIG. 1 illustrates a flow chart of a manufacturing method for an electronic device according to some embodiments of the present disclosure.

Reference will be made in detail to embodiments of the present disclosure. The same or similar elements and the elements having same or similar functions are denoted by like reference numerals throughout the descriptions.

In addition, the embodiments described herein with reference to drawings are explanatory, and used to generally understand the present disclosure. The embodiments shall not be construed to limit the present disclosure.

In the present invention, unless specified or limited otherwise, a structure in which a first feature is "on" or "below" a second feature can include an embodiment in which the first feature is in direct contact with the second feature, and can also include an embodiment in which the first feature and the second feature are not in direct contact with each other, but are contacted via an additional feature formed therebetween. Furthermore, a first feature "on", "above" or "on top of" a second feature can include an embodiment in which the first feature is right or obliquely "on", "above" or "on top of" the second feature, or just means that the first feature is at a height higher than that of the second feature; while a first feature "below", "under" or "on bottom of" a second feature can include an embodiment in which the first feature is right or obliquely "below", "under" or "on bottom of" the second feature, or just means that the first feature is at a height lower than that of the second feature.

FIG. 1 illustrates a flow chart of a manufacturing method for an electronic device 100 according to embodiments of the present disclosure. The manufacturing method includes actions in following blocks.

In block S1: an inner shell 10 is provided, the inner shell 10 has a battery compartment 101 for a battery 20, and the battery compartment 101 includes a bottom surface 102 and a side wall 103.

Figure 4:
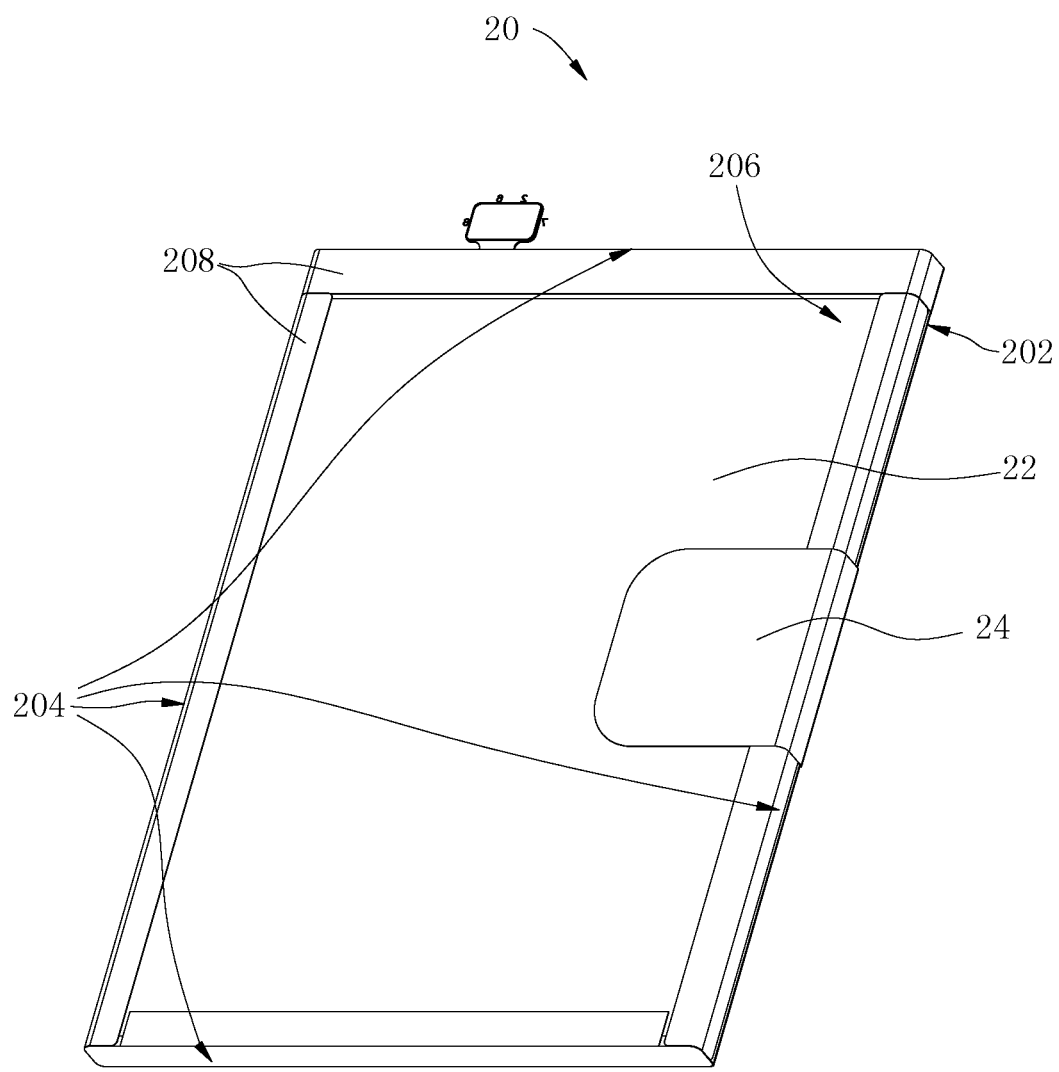
FIG. 4 illustrates a stereoscopic schematic view of a battery according to some embodiments of the present disclosure.
Figure 5:
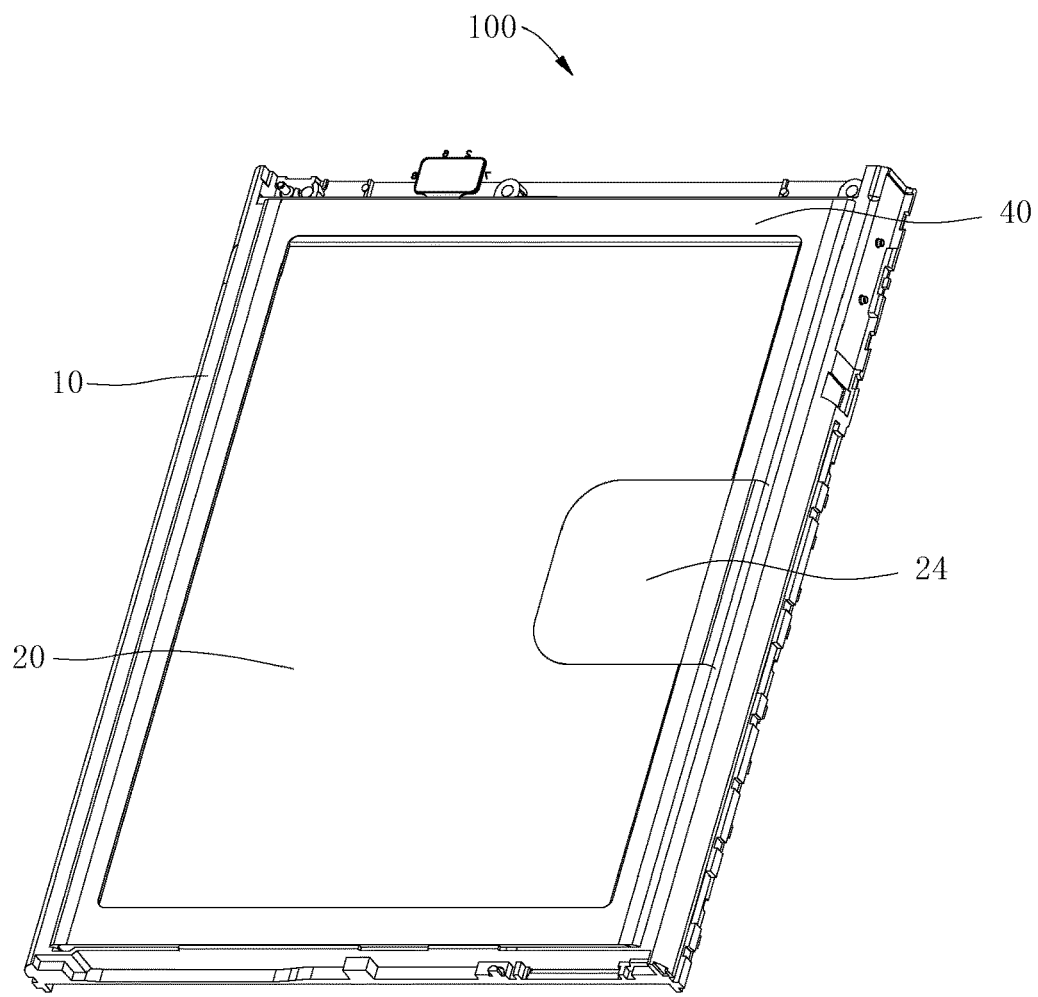
FIG. 5 illustrates a stereoscopic schematic view of an electronic device according to some embodiments of the present disclosure.

In embodiments of the present disclosure, the battery 20 includes a lower surface 202 opposed to the bottom surface 102 and a side surface 204 corresponding to the side wall 103, as illustrated in FIG. 4.

In block S2: a first adhesive 30 is adhered to the bottom surface 102 of the battery compartment 101.

In block S3: an adhesive film 60 is provided and covers the first adhesive 30, the bottom surface 102 and the side wall 103 of the battery compartment 101.

In embodiments of the present disclosure, the adhesive film 60 is adhered to the bottom surface 102, the side wall 103 and the first adhesive 30, so as to immobilize the adhesive film 60 in the battery compartment 101 and on the first adhesive 30. The lower surface 202 of the battery 20 is adhered to the adhesive film 60 so as to pre-immobilize the battery 20 on the adhesive film 60.

In block S4, the battery 20 is fixed in the battery compartment 101 by the adhesive film 60.

In block S5: a second adhesive 40 is coated into spaces between the side surface 204 of the battery 20 and the adhesive film 60. A bonding force of the adhesive film 60 and a bonding force of the second adhesive 40 each is less than a tensile resistance of a surface of the battery 20.

In embodiments of the present disclosure, the second adhesive 40 is coated between a part of the adhesive film 60 corresponding to the side wall 103 and the side surface 204 of the battery 20, so as to immobilize the battery 20 to the adhesive film 60. A bonding force of the adhesive film 60 and a bonding force of the second adhesive 40 each are less than a tensile resistance of a surface of the battery.

In some embodiments, the battery 20 further includes an upper surface 206 opposite to the lower surface 202, and the manufacturing method further includes actions in following blocks.

In block S6: the second adhesive 40 is coated on the upper surface 206 of the battery 20.

In some embodiments of the present disclosure, the second adhesive 40 is coated on the whole upper surface 206 of the battery 20.

In other embodiments of the present disclosure, the second adhesive 40 is coated at a peripheral edge of the upper surface 206.

In block S7: a back cover 50 is coupled to the inner shell 10, and the back cover 50 presses against the second adhesive 40. For example, the back cover 50 can be snapped-fitted with or fastened to the inner shell 10.

In block S8: the second adhesive 40 is solidified.

That is, the manufacturing method according to embodiments of the present disclosure can include actions in above blocks S1-S8.

As illustrated in FIGS. 2-7, the electronic device 100 according to embodiments of the present disclosure includes the inner shell 10, the battery 20, the first adhesive 30, the adhesive film 60 and the second adhesive 40. The inner shell 10 has the battery compartment 101 for the battery 20, and the battery compartment 101 includes the bottom surface 102 and the side wall 103. The battery 20 includes the lower surface 202 opposed to the bottom surface 102 and the side surface 204 corresponding to the side wall 103. The first adhesive 30 is adhered to the bottom surface 102 of the battery compartment 101. The adhesive film 60 covers the first adhesive 30, the bottom surface 102 and the side wall 103 of the battery compartment 101. In embodiments of the present disclosure, the adhesive film 60 is adhered to the bottom surface 102, the side wall 103 and the first adhesive 30, so as to immobilize the adhesive film 60 in the battery compartment 101 and on the first adhesive 30. Furthermore, the battery 20 is received in the battery compartment 101, and the lower surface 202 of the battery 20 is adhered to the adhesive film 60, so as to pre-immobilize the battery 20 on the adhesive film 60. The second adhesive 40 is coated in spaces between the battery 20 and the side wall 103 of the battery compartment 101. In embodiments of the present disclosure, the second adhesive 40 is coated between a part of the adhesive film 60 corresponding to the side wall 103 and the side surface 204 of the battery 20, so as to immobilize the battery 20 to the adhesive film 60. The bonding force of the adhesive film 60 and the bonding force of the second adhesive 40 each are less than the tensile resistance of the surface of the battery 20.

For the manufacturing method and the electronic device 100 according to embodiments of the present disclosure, the adhesive film 60, the first adhesive 30 and the second adhesive 40 are cooperatively used to immobilize the battery 20 in the battery compartment 101. Since the bonding force of the adhesive film 60 and the bonding force of the second adhesive 40 each are less than the tensile resistance of the surface of the battery, the battery 20 can be prevented from being bent or damaged due to a too large bonding force of the adhesive film 60 or the second adhesive 40 for adhering to the battery 20 when demounting the battery 20, which otherwise can cause the battery 20 to be scrapped. Also, by arranging the adhesive film 60 between the battery 20 and the battery compartment 101, it just needs to tear the adhesive film 60 out of the battery compartment 101 after the battery 20 is demounted, so as to clear the second adhesive 40 adhered to the adhesive film 60 away from the battery compartment 101, thus facilitating clearing of the second adhesive 40 adhered in the battery compartment 101. Therefore, the second adhesive 40 is prevented from flowing to the bottom surface 102 along the side wall 103, which otherwise can cause the adhesive 40 to be adhered to the bottom surface 102 and difficult to clear.

In some embodiments of the present disclosure, the side wall 103 of the battery compartment 101 is connected with the bottom surface 102 and the side wall 103 surrounds the bottom surface 102 to form the battery compartment 101. The side surface 204 of the battery 20 is connected with the lower surface 202 and the side surface 204 surrounds the lower surface 202. The adhesive film 60 is located between the battery compartment 101 and the battery 20, the first adhesive 30 is located between the battery compartment 101 and the adhesive film 60, and the second adhesive 40 is located between the adhesive film 60 and the battery 20. That is, the battery compartment 101, the first adhesive 30, the adhesive film 60 and the second adhesive 40 are sequentially arranged from the bottom up. The adhesive film 60 is immobilized in the battery compartment 101 through the first adhesive 30, the battery 20 is immobilized to the adhesive film 60 through the adhesive film 60 itself and the second adhesive 40 in such a manner that the lower surface 202 is opposed to the bottom surface 102 and the side surface 204 is opposed to the side wall 103. When the battery 20 is pre-immobilized in the battery compartment 101, the bonding force of the adhesive film 60 just needs to ensure that a mounting location of the battery 20 will not change during a manufacturing process, instead of completely immobilizing the battery 20 through the adhesive film 60.

In some embodiments, "the bonding force of the adhesive film 60 and the bonding force of the second adhesive 40 each are less than the tensile resistance of the surface of the battery" can be interpreted in a manner that the bonding force of the adhesive film 60 is less than the tensile resistance of the surface of the battery in a corresponding location of the battery 20 where the adhesive film 60 is adhered and the bonding force of the second adhesive 40 is less than the tensile resistance of the surface of the battery in a corresponding location of the battery 20 where the second adhesive 40 is adhered.

Experiments prove that, if the battery 20 is a lithium battery and a surface of a battery cell of the battery 20 adopts an aluminum-plastic film package, under a cooperative action of the bonding force of the adhesive film 60 and the bonding force of the second adhesive 40, the battery 20 can be completely immobilized to the adhesive film 60.

The electronic device 100 includes, but is not limited to, a mobile phone, a tablet computer, a smart watch or the like. The mobile phone is elaborated as an example of the electronic device 100 in the present embodiment.

Figure 2:
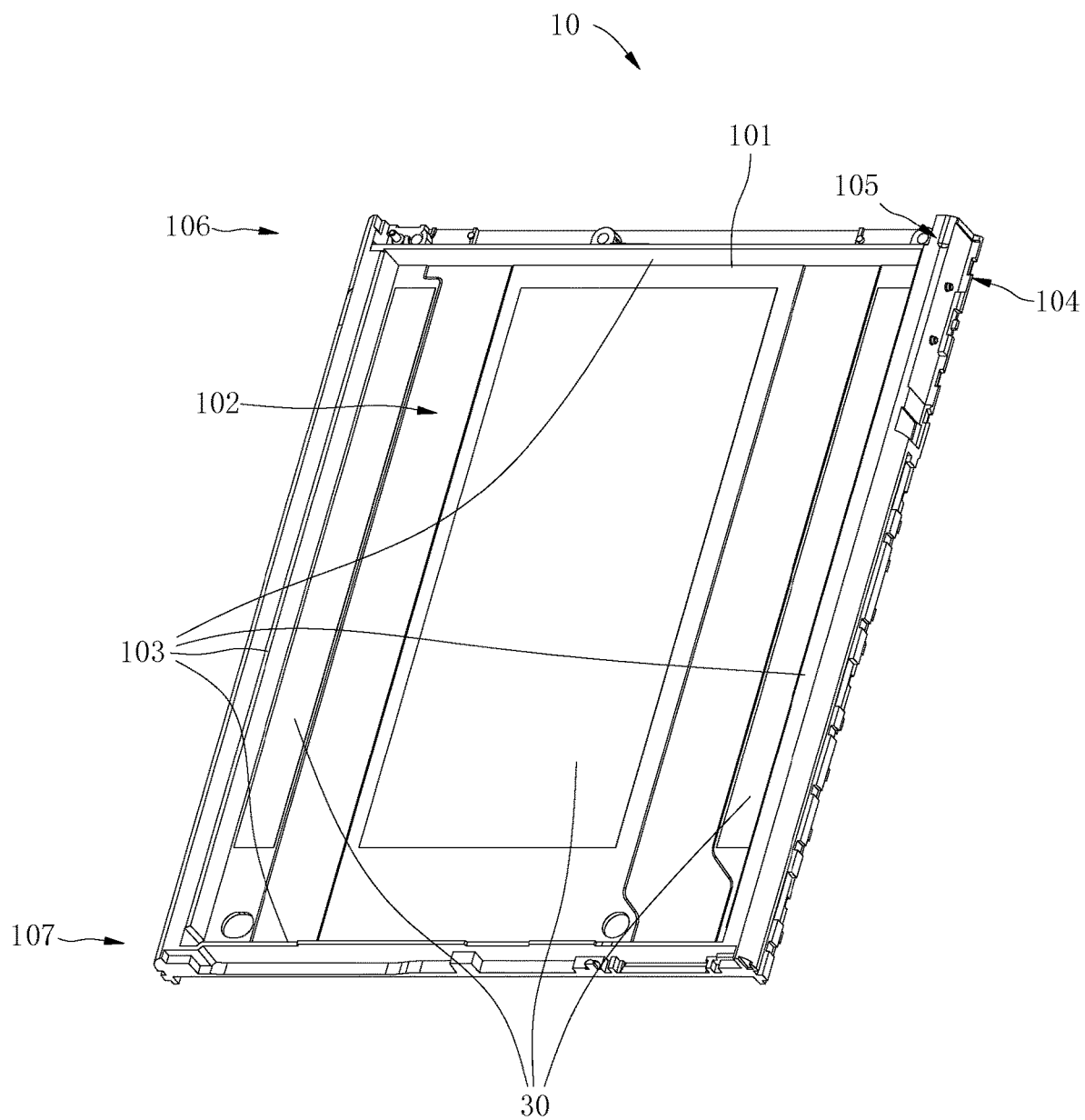
FIG. 2 illustrates a stereoscopic schematic view of an inner shell according to some embodiments of the present disclosure.

As illustrated in FIG. 2, the inner shell 10 is in a shape of a rectangular frame, the inner shell 10 includes a front surface 104 and a rear surface 105 opposite to the front surface 104, and the inner shell 10 further includes an upper end 106 and a lower end 107 opposite to the upper end 106.

The battery compartment 101 presents a rectangle shape and is formed in the rear surface 105 and adjacent to the lower end 107. The battery compartment 101 includes the bottom surface 102 and the side wall 103, the side wall 103 of the battery compartment 101 is connected with the bottom surface 102, and the side wall 103 surrounds the bottom surface 102 to form the battery compartment 101.

By providing the battery 20 at an end of the inner shell 10, it is convenient for heat radiated by the battery 20 to be dissipated out of the inner shell 10, thereby avoiding the heat dissipation from being difficult when the battery 20 is located in the middle of the inner shell 10, which otherwise can cause the temperature of the whole electronic device 100 to be excessively high.

The inner shell 10 can be made from plastic.

As illustrated in FIG. 4, the battery 20 is in a shape of a rectangle block, and the battery 20 includes a body 22 and a hand-pull strip 24.

The body 22 includes the lower surface 202, the side surface 204, an upper surface 206 and a battery cover 208. The side surface 204 is connected with the lower surface 202 and the upper surface 206. The side surface 204 surrounds the lower surface 202 and the upper surface 206. The lower surface 202 and the upper surface 206 are opposite to each other. The battery cover 208 is arranged to the side surface 204 of the body 22.

The hand-pull strip 24 is in a shape of a rectangle strip. In some embodiments of the present disclosure, the hand-pull strip 24 includes a fixed end fixed to the lower surface 202 and the side surface 204 and a free end extending out of a gap between the side wall 103 and the side surface 204.

When the battery 20 needs to be demounted, a user can remove the battery 20 out of the battery compartment 101 by pulling the free end. In some other embodiments of the present disclosure, the hand-pull strip 24 can be fixedly disposed to the lower surface 202, the side surface 204 and the upper surface 206.

In some embodiments of the present disclosure, the hand-pull strip 24 is entirely attached to the surface of the body 22. When the battery 20 needs to be demounted, the user can lift the battery 20 up at the position where the hand-pull strip 24 is attached, so as to remove the battery 20 out of the battery compartment 101. In some embodiments of the present disclosure, the user can also use other tools to dig the battery 20 out at the position where the hand-pull strip 24 is attached. For example, the user can also use the other tools to pry the battery 20 out while pulling the hand-pull strip 24.

The battery 20 is mounted in the battery compartment 101 in such a manner that the lower surface 202 is opposed to the bottom surface 102 and the side surface 204 is opposed to the side wall 103. An area of the lower surface 202 of the battery 20 is less than an area of the bottom surface 102 of the battery compartment 101, such that the battery 20 can be mounted in the battery compartment 101 and there exists a gap between the side surface 204 and the side wall 103. A depth of the battery compartment 101 can be larger than, smaller than or equal to a thickness of the battery 20.

The battery 20 can be the lithium battery and the surface of the battery cell of the battery 20 adopts an aluminum-plastic film package. The material of the battery cover 208 includes plastic. The tensile resistance of the lower surface 202 of the battery 20 and the tensile resistance of the upper surface 206 of the battery 20 are less than or equal to 1 $N/cm^2$, the tensile resistance of the side surface 204 is less than 10 $N/cm^2$. The hand-pull strip 24 can include a heat-resistant polyester film (PET film).

Figure 6:
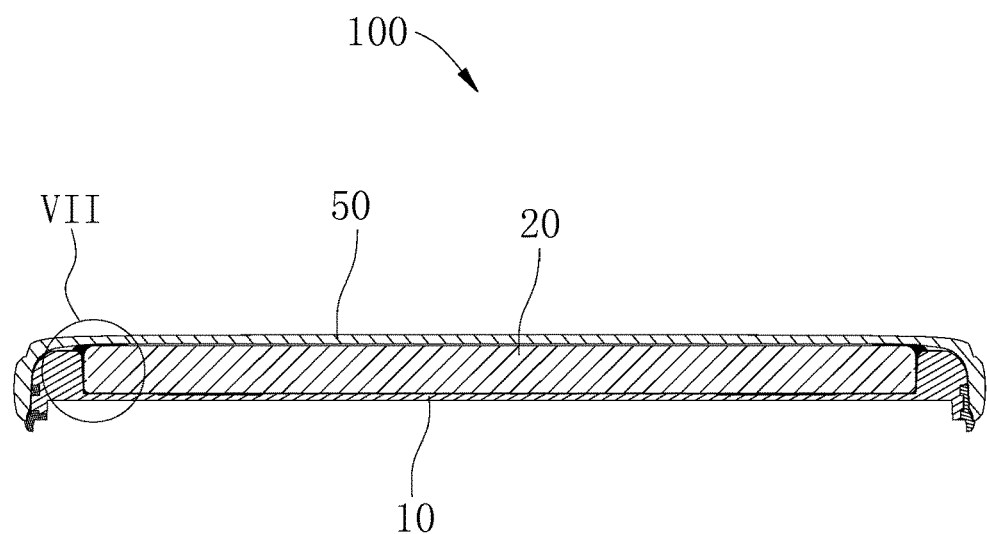
FIG. 6 illustrates a section view of an electronic device according to some embodiments of the present disclosure.
Figure 7:
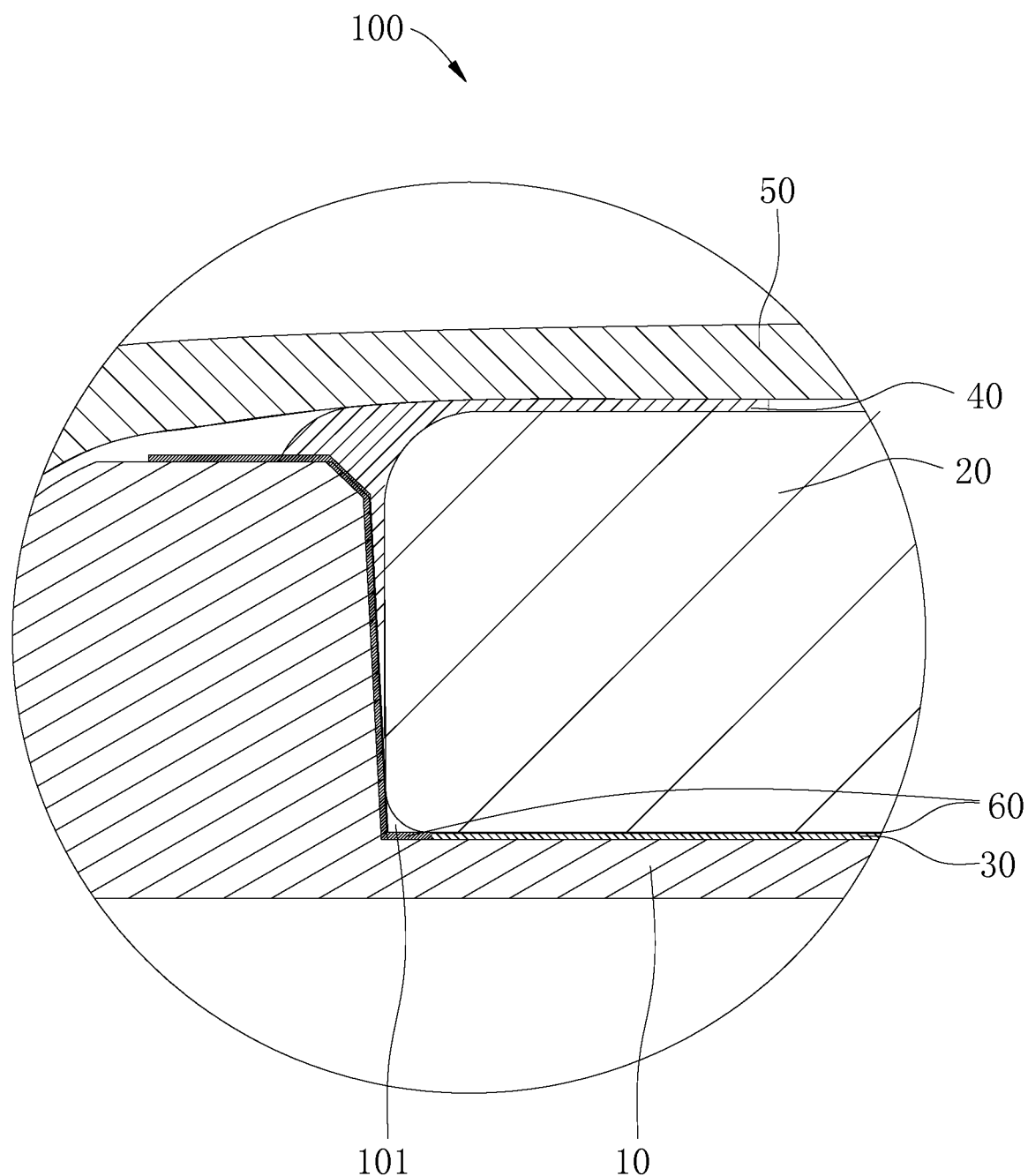
FIG. 7 illustrates a partially enlarged view of part VII circled in FIG. 6.

As illustrated in FIGS. 2, 6 and 7, the first adhesive 30 is arranged on the bottom surface 102 of the battery compartment 101. The first adhesive 30 is configured to be adhered to and immobilized on the bottom surface 102 of the battery compartment 101. In some embodiments of the present disclosure, the first adhesive 30 is adhered to only part of the bottom surface 102 (that is, the first adhesive does not cover the bottom surface 102 completely), and the first adhesive 30 is a double-sided adhesive.

Figure 3:
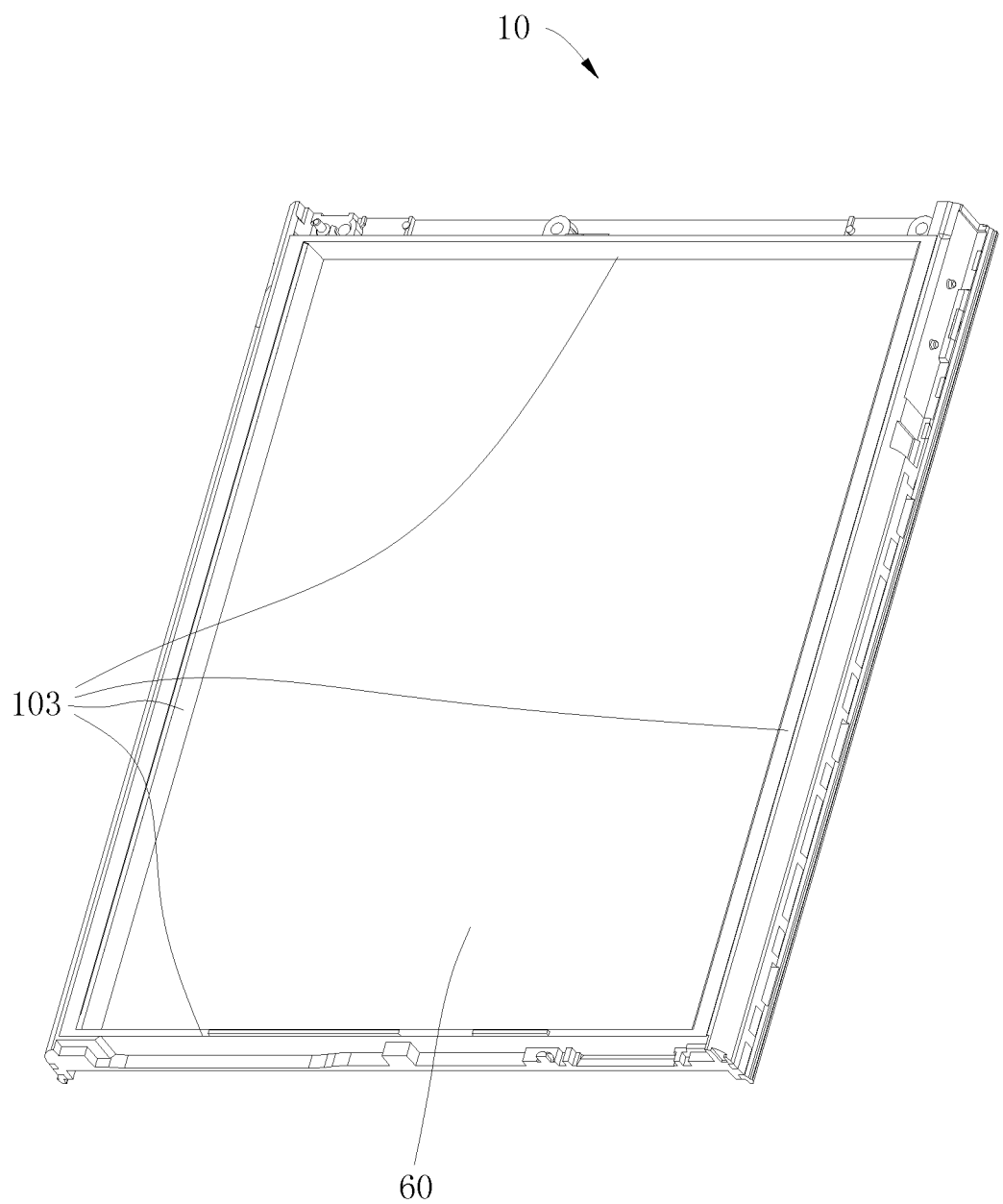
FIG. 3 illustrates a stereoscopic schematic view of an inner shell according to some embodiments of the present disclosure.

As illustrated in FIGS. 3, 6 and 7, the adhesive film 60 is adhered to the bottom surface 102, the side wall 103 and the first adhesive 30. In some embodiments of the present disclosure, at a position in the battery compartment 101 where the first adhesive 30 is provided, the adhesive film 60 is located between the first adhesive 30 and the battery 20, and at a position in the battery compartment 101 where the first adhesive 30 is not provided, the adhesive film 60 is located between the battery compartment 101 and the battery 20. The adhesive film 60 has a certain bonding force. Under the cooperative action of the bonding force of the adhesive film 60 for adhering to the bottom surface 102, the bonding force of the adhesive film 60 for adhering to the side wall 103 and the bonding force of the first adhesive 30 for adhering to the adhesive film 60, the adhesive film 60 can be immobilized in the battery compartment 101. The lower surface 202 of the battery 20 is adhered to the adhesive film 60, and the adhesive film 60 is configured to pre-immobilize the battery 20 to the adhesive film 60. The bonding force of the adhesive film 60 for adhering to the lower surface 202 is less than the tensile resistance of the corresponding surface of the battery while larger than a force required for pre-immobilizing the battery 20 to the adhesive film 60. In some embodiments of the present disclosure, such surface of the battery is the lower surface 202 of the battery 20, and the tensile resistance of such surface of the battery is less than 1 N/cm². The adhesive film 60 can adopt a polyethylene terephthalate (PET) adhesive film.

As illustrated in FIGS. 6 and 7, the second adhesive 40 is coated in a gap between the part of the adhesive film 60 corresponding to the side wall 103 of the battery compartment 101 and the side surface 204 of the battery 20, so as to immobilize the battery 20 to the adhesive film 60. The bonding force of the second adhesive 40 for adhering to the side surface 204 is less than the tensile resistance of the corresponding surface of the battery, and the bonding force of the second adhesive 40 for adhering to the side surface 204 and the bonding force of the first adhesive 30 both are larger than a force required for immobilizing the battery 20. In some embodiments of the present disclosure, such surface of the battery is the side surface 204 of the battery 20, the tensile resistance of such surface of the battery is less than 10 N/cm². The second adhesive 40 can adopt a silicone adhesive, in which case the second adhesive 40 can be arranged in the gap by means of adhesive dispensing.

In embodiments of the present disclosure, the second adhesive 40 can be coated on the upper surface 206 or at a peripheral edge of the upper surface 206. Furthermore, the electronic device 100 can further include a back cover 50, and the back cover 50 is coupled to the inner shell 10 so as to cover the battery 20 and press against the second adhesive 40, as illustrated in FIGS. 6 and 7. For example, the back cover 50 can be snapped-fitted with or fastened to the inner shell 10.

In some embodiments of the present disclosure, if there is a gap between the lower surface 202 of the battery 20 and the bottom surface 102 of the battery compartment 101 (that is, a gap exists between the part of the adhesive film 60 corresponding to the bottom surface 102 and the lower surface 202), and the gap is larger than an increase of a volume of the battery 20 after expansion, the second adhesive 40 can be coated on the whole upper surface 206. In this case, the bonding force of the second adhesive 40 for adhering to the side surface 204 is less than the tensile resistance of the side surface 204 of the battery 20, and also the bonding force of the second adhesive 40 for adhering to the upper surface 206 is less than the tensile resistance of the upper surface 206 of the battery 20.

In some other embodiments of the present disclosure, if a gap exists between the lower surface 202 of the battery 20 and the bottom surface 102 of the battery compartment 101, while the gap is smaller than an increase of the volume of the battery 20 after expansion, or there is no gap between the lower surface 202 and the bottom surface 102, the second adhesive 40 can be coated at the peripheral edge of the upper surface 206, such that there exists a gap between a center position of the upper surface 206 of the battery 20 and the back cover 50. In this case, the bonding force of the second adhesive 40 for adhering to the side surface 204 is less than the tensile resistance of the side surface 204 of the battery 20, and also the bonding force of the second adhesive 40 for adhering to the peripheral edge of the upper surface 206 is less than the tensile resistance of the upper surface 206 of the battery 20. When the battery 20 is deformed and expands, the gap can accommodate the increase of the volume of the battery 20 due to expansion, thereby avoiding the expanded battery 20 from being compressed, which otherwise can result in failure or even explosion. Before the second adhesive 40 is solidified, when the back cover 50 is snap-fitted with and fastened to the inner shell 10, the back cover 50 presses against the second adhesive 40, so as to allow the second adhesive 40 to completely fill up the gap between the side wall 103 and the side surface 204 (that is, the gap between the part of the adhesive film 60 corresponding to the side wall 103 and the side surface 204). After the second adhesive 40 is solidified, the back cover 50 presses against the second adhesive 40, such that the battery 20 is immobilized in the battery compartment 101, thereby preventing loosening of the battery 20 with a great effect.

For the manufacturing method for the electronic device 100 and the electronic device 100 according to embodiments of the present disclosure, the first adhesive 30 and the second adhesive 40 are cooperatively used to immobilize the battery 20 in the battery compartment 101. Since the bonding force of the first adhesive 30 and the bonding force of the second adhesive 40 each are less than the tensile resistance of the surface of the battery, the battery 20 can be prevented from being bent or damaged due to a too large bonding force of the adhesive for adhering to the battery 20 when demounting the battery 20, which otherwise can cause the battery 20 to be scrapped. Also, by arranging the adhesive film 60 between the battery 20 and the battery compartment 101, it just needs to tear the adhesive film 60 out of the battery compartment 101 after the battery 20 is demounted, so as to clear the second adhesive 40 adhered to the adhesive film 60 away from the battery compartment 101, thus facilitating clearing of the second adhesive 40 adhered in the battery compartment 101. Therefore, the second adhesive 40 is prevented flowing to the bottom surface 102 along the side wall 103, which otherwise can cause the adhesive 40 to be adhered to the bottom surface 102 and difficult to clear.

In addition, the electronic device 100 according to embodiments of the present disclosure further includes following beneficial effects. Firstly, the inner shell 10 and the battery compartment 101 each present a regular shape, and hence the inner shell 10 and the battery compartment 101 according to embodiments of the present disclosure are easier to be formed and manufactured, in contrast to irregular-shaped inner shell and battery compartment. Moreover, in contrast to the inner shell 10 made of metal materials, the inner shell 10 made of plastic materials is easier to be formed and manufactured, and the inner shell made of plastic materials has a lighter weight and a lower cost than the inner shell made of metal materials.

Secondly, since the battery 20 is provided with the battery cover 208 at the side surface 204, the gap between the side surface 204 and the side wall 103 is prevented from being reduced due to an expansion of the battery 20 in a direction from a center position to the side wall 103, thereby avoiding the battery 20 from being difficult to be demounted due to an increase of the bonding force between the side surface 204 and the side wall 103. Since the battery 20 is provided with the hand-pull strip 24, it is convenient for the user to remove the battery 20 out of the battery compartment 101 at the position of the hand-pull strip 24 through the hand-pull strip 24 or other tools. For example, the user can also use the other tools to pry the battery 20 out while pulling the hand-pull strip 24.

Furthermore, the bonding force of the adhesive film 60 for adhering to the battery compartment 101 is small, however the double-sided adhesive can adhere to the battery compartment 101 and the adhesive film 60 firmly, and therefore the adhesive film 60 can be adhered in the battery compartment 101 firmly through the double-sided adhesive, thus avoiding the battery 20 immobilized to the adhesive film 60 from moving along with the adhesive film 60. Also, a double-sided adhesive tap can be used as the first adhesive 30 to adhere to the adhesive film 60 and the battery compartment 101, and does not need to be solidified, such that the mounting process of immobilizing the adhesive film 60 in the battery compartment 101 through the double-sided adhesive tape is easy and convenient.

Moreover, the silicone adhesive is similar to an unguent and the solidified silicone adhesive has vibration resistance, such that the silicone adhesive is convenient to be dripped in the gap between the side surface 204 of the battery 20 and the adhesive film 60 corresponding to the side wall 103 by means of adhesive dispensing. When the silicone adhesive is solidified, the silicone adhesive can immobilize the battery 20 to the adhesive film 60 even if a vibration occurs to the electronic device 100.

In some embodiments, the inner shell 10, the battery compartment 101 and the battery 20 in the above embodiments are not limited to their shapes mentioned in the above embodiments. The shapes of the inner shell 10, the battery compartment 101 and the battery 20 which allow the shape and dimension matching between the battery 20 and the battery compartment 101 all fall into the protection scope of the present disclosure. That is, the shape of the battery 20 is similar to that of the battery compartment 101, the dimension of the lower surface 202 of the battery 20 is slightly smaller than the dimension of the bottom surface 102 of the battery compartment 101, and the dimension of the side surface 204 of the battery 20 is slightly smaller than the dimension of the side wall 103 of the battery compartment 101, so as to allow the battery 20 to be mounted in the battery compartment 101. Therefore, the battery 20 can be mounted in the battery compartment 101, and the structure of the electronic device 100 is more compact after the battery 20 is mounted in the battery compartment 101.

In some embodiments, the material of the inner shell 10 in the above embodiments is not limited to the plastic materials mentioned in the above embodiments, and the inner shell 10 can also be made of metal materials (e.g. aluminum alloy or magnesium alloy), non-metal materials or other special materials in the light of requirements.

In some embodiments, a plurality of hand-pull strips 24 can be provided. The plurality of hand-pull strips 24 can be disposed to the battery 20 symmetrically or can be disposed to the same side of the battery 20, so that it is convenient to remove the battery 20 out of the battery compartment 101 through the plurality of hand-pull strips 24. In some embodiments of the present disclosure, the battery 20 in the above embodiments may not include the hand-pull strip 24 or the battery cover 208, and the battery 20 can still be removed out of the battery compartment 101 without being damaged, as long as the bonding force of the first adhesive 30 and the bonding force of the second adhesive 40 each are less than the tensile resistance of the surface of the battery.

In some embodiments, the adhesive film 60 in the above embodiments is not limited to the PET adhesive film. The adhesive film 60 can also be another adhesive film having adhesiveness, as long as the adhesive film can pre-immobilize the battery 20 to the adhesive film. These adhesive films all fall into the protection scope of the present disclosure.

As illustrated in FIG. 2, in some embodiments, the first adhesive 30 in the above embodiments includes a plurality of double-sided adhesive tapes, and the plurality of double-sided adhesive tapes are distributed on the bottom surface 102 and spaced apart from one another. By arranging the plurality of double-sided adhesive tapes, the bonding force for pre-immobilizing the battery 20 in the battery compartment 101 is large, so as to avoid the battery 20 from moving during the manufacturing process of the electronic device 100, which otherwise can result in a low manufacturing precision of the electronic device 100. In some embodiments of the present disclosure, the first adhesive 30 is not limited to the double-sided adhesive tape, and the first adhesive 30 can also be an easy-pull glue or an easy-remove sticker.

In some embodiments, the second adhesive 40 mentioned in the above embodiments is not limited to the silicone adhesive. The second adhesive 40 can also choose other glues, as long as the glue can be dripped into the gap between the side surface 204 and the side wall 103, and the bonding force of the solidified glue is less than the tensile resistance of the surface of the battery.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics can be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" can comprise one or more of this feature. In the description of the present invention, "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A manufacturing method for an electronic device, comprising:
providing an inner shell, the inner shell defining a battery compartment for a battery, and the battery compartment comprising a bottom surface and a side wall;
adhering a first adhesive to the bottom surface of the battery compartment, the first adhesive covering a part of the bottom surface;
providing an adhesive film having adhesiveness, the adhesive film covering and being adhered to the first adhesive, another part of the bottom surface uncovered by the first adhesive, and the side wall of the battery compartment, via the adhesiveness;
fixing the battery in the battery compartment by adhering the battery to the adhesive film; and
coating a second adhesive into spaces between a side surface of the battery and the adhesive film, a bonding force of the adhesive film and a bonding force of the second adhesive each being less than a tensile resistance of a surface of the battery.

2. The manufacturing method for the electronic device according to claim 1, further comprising:
coating the second adhesive on an upper surface of the battery;

coupling a back cover to the inner shell, wherein the back cover presses against the second adhesive; and
solidifying the second adhesive.

3. The manufacturing method for the electronic device according to claim 1, wherein a bonding force of the adhesive film for adhering to a lower surface of the battery is less than a tensile resistance of the lower surface of the battery.

4. The manufacturing method for the electronic device according to claim 1, wherein a bonding force of the second adhesive for adhering to the side surface of the battery is less than a tensile resistance of the side surface of the battery.

5. The manufacturing method for the electronic device according to claim 2, wherein a bonding force of the second adhesive for adhering to the upper surface of the battery is less than a tensile resistance of the upper surface of the battery.

6. An electronic device, comprising:
an inner shell defining a battery compartment for a battery, the battery compartment comprising a bottom surface and a side wall;
a first adhesive adhered to the bottom surface of the battery compartment, and covering a part of the bottom surface;
an adhesive film having adhesiveness, the adhesive film covering and adhered to the first adhesive, another part of the bottom surface uncovered by the first adhesive, and the side wall of the battery compartment via the adhesiveness;
a battery adhered to the adhesive film and received in the battery compartment; and
a second adhesive coated in spaces between a side surface of the battery and the adhesive film, a bonding force of the adhesive film and a bonding force of the second adhesive each being less than a tensile resistance of a surface of the battery.

7. The electronic device according to claim 6, wherein the second adhesive is coated on an upper surface of the battery, the electronic device further comprises a back cover coupled to the inner shell, and the back cover presses against the second adhesive.

8. The electronic device according to claim 6, wherein a bonding force of the adhesive film for adhering to a lower surface of the battery is less than a tensile resistance of the lower surface of the battery.

9. The electronic device according to claim 6, wherein a bonding force of the second adhesive for adhering to a side surface of the battery is less than a tensile resistance of the side surface of the battery.

10. The electronic device according to claim 7, wherein a bonding force of the second adhesive for adhering to the upper surface of the battery is less than a tensile resistance of the upper surface of the battery.

11. The electronic device according to claim 6, wherein the inner shell is made of plastic.

12. The electronic device according to claim 6, wherein the inner shell is in a shape of a rectangular frame and comprises a front surface and a rear surface opposite to the front surface, the inner shell further comprises an upper end and a lower end opposite to the upper end, the battery compartment presents a rectangle shape and is provided in the rear surface and adjacent to the lower end.

13. The electronic device according to claim 6, wherein a shape of the battery is matched with a shape of the battery compartment, and a dimension of the battery is matched with a dimension of the battery compartment.

14. The electronic device according to claim 6, wherein the adhesive film comprises a polyethylene terephthalate adhesive film.

15. The electronic device according to claim 6, wherein the first adhesive comprises a double-sided adhesive tape.

16. The electronic device according to claim 6, wherein the first adhesive comprises a plurality of double-sided adhesive tapes, the plurality of double-sided adhesive tapes are distributed on the bottom surface and spaced apart from one another.

17. The electronic device according to claim 6, wherein the second adhesive comprises a silicone adhesive.

18. The electronic device according to claim 6, wherein the battery comprises:
a body comprising a lower surface, an upper surface opposite to the lower surface and a side surface; and
a hand-pull strip fixedly disposed to the lower surface and the side surface, and extending out from a gap between the side wall and the side surface.

19. The electronic device according to claim 6, wherein the battery comprises:
a body comprising a lower surface, an upper surface opposite to the lower surface and a side surface; and
a hand-pull strip fixedly disposed to the lower surface, the side surface and the upper surface.

20. An electronic device, comprising:
an inner shell defining a battery compartment;
a battery received in the battery compartment;
an adhesive film having adhesiveness, arranged between the battery compartment and the battery and adhered to both via the adhesiveness;
a first adhesive arranged between the battery compartment and the adhesive film and adhered to both; and
a second adhesive coated in a lateral gap between a side surface of the battery and the adhesive film;
wherein:
the first adhesive is adhered to a bottom surface of the battery compartment and covers a part of the bottom surface,
the adhesive film covers and is adhered to the first adhesive, another part of the bottom surface uncovered by the first adhesive, and a side wall of the battery compartment, via the adhesiveness, and
a bonding force of the adhesive film and a bonding force of the second adhesive each are less than a tensile resistance of a surface of the battery.

* * * * *